(12) United States Patent
White et al.

(10) Patent No.: US 11,259,080 B2
(45) Date of Patent: Feb. 22, 2022

(54) SENSING BASED AUDIO SIGNAL INJECTION

(71) Applicant: Vanco International, LLC, Batavia, IL (US)

(72) Inventors: Brandon White, Batavia, IL (US); Joseph Allen Whitaker, Wentzville, MO (US); Mark Corbin, Batavia, IL (US)

(73) Assignee: Vanco International, L.L.C., Batavia, IL (US)

( * ) Notice: Subject to any disclaimer, the term of this patent is extended or adjusted under 35 U.S.C. 154(b) by 0 days.

(21) Appl. No.: 17/077,697

(22) Filed: Oct. 22, 2020

(65) Prior Publication Data

US 2021/0176517 A1 Jun. 10, 2021

Related U.S. Application Data

(63) Continuation of application No. 16/558,728, filed on Sep. 3, 2019, now Pat. No. 10,848,818.

(60) Provisional application No. 62/726,336, filed on Sep. 3, 2018.

(51) Int. Cl.
*H04N 21/439* (2011.01)
*H04N 21/4363* (2011.01)
*H04N 21/4408* (2011.01)
*G06F 3/16* (2006.01)

(52) U.S. Cl.
CPC ........... *H04N 21/439* (2013.01); *G06F 3/162* (2013.01); *H04N 21/43635* (2013.01); *H04N 21/4408* (2013.01)

(58) Field of Classification Search
CPC ........... H04N 21/439; H04N 21/43635; H04N 21/4408; H04N 21/4622; H04N 21/44; H04N 21/4344; G06F 3/162
See application file for complete search history.

(56) References Cited

U.S. PATENT DOCUMENTS

| | | | | |
|---|---|---|---|---|
| 6,593,976 B1* | 7/2003 | Lord | ................... | H04N 21/4263 348/731 |
| 2003/0023741 A1* | 1/2003 | Tomassetti | ....... | H04N 21/43615 709/231 |
| 2003/0208771 A1* | 11/2003 | Hensgen | .......... | H04N 21/21805 725/100 |
| 2007/0120975 A1* | 5/2007 | Tsai | ..................... | H04N 21/439 348/61 |
| 2012/0120270 A1* | 5/2012 | Li | ......................... | H04N 21/439 348/222.1 |
| 2012/0263318 A1* | 10/2012 | Millington | ............... | H04R 3/12 381/107 |
| 2016/0227261 A1* | 8/2016 | Neumeier | ........ | H04N 21/44008 |
| 2017/0280169 A1* | 9/2017 | Maness | ................ | H04N 21/439 |
| 2018/0278999 A1* | 9/2018 | David | ................ | H04N 21/4622 |

\* cited by examiner

*Primary Examiner* — Fernando Alcon
(74) *Attorney, Agent, or Firm* — Charles T. Riggs, Jr.

(57) ABSTRACT

Processing circuitry of a connectivity device can receive an audio video signal from a first source. The processing circuitry can also receive an audio signal from a second source. The processing circuitry can transmit the audio video signal to a sink device. When an audio level from the second source exceeds a threshold, the processing circuitry can send the audio signal from the second source along with the video signal from the first source to the sink device.

12 Claims, 8 Drawing Sheets

SENSING BASED AUDIO SIGNAL INJECTION

CROSS-REFERENCE TO RELATED APPLICATIONS

This application claims the benefit of U.S. Provisional Application No. 62/726,336, filed Sep. 3, 2018, the entire contents of which is hereby incorporated herein by reference.

BACKGROUND

Audio and video are regularly transmitted to viewing devices, such as televisions. The televisions can render the video on a display and output the audio from a speaker. The audio and video can be sent from a variety of devices. As an example, a DVD player or cable set top box can provide an audio video output to a television. When watching television, a viewer may want to listen to music or other audio rather than the audio sent to the television. To accomplish this, the viewer must mute the sound and listen to their music on another device while the television is muted.

SUMMARY

A connectivity device and method for audio signal injection are described. In one embodiment, a connectivity device includes a first high definition media interface (HDMI) port, a second HDMI port, an audio source port, and signal processing circuitry coupled to the first HDMI port, the second HDMI port, and the audio source port.

In one aspect of the embodiments, the signal processing circuitry can be configured to receive a first plurality of signals over the first HDMI port, where the first plurality of signals include a video component and an audio component. The signal processing circuitry can also receive at least one audio signal over the audio source port and transmit a second plurality of signals over the second HDMI port, where the second plurality of signals include the video component and the audio component from the first HDMI port. The signal processing circuitry can also determine that an audio level of the at least one audio signal exceeds a threshold. In response to the audio level exceeding the threshold, the signal processing circuitry can also replace the audio component in the second plurality of signals with the least one audio signal.

In other aspects of the embodiments, the signal processing circuitry can determine that the audio level of the at least one audio signal falls below the threshold for a predefined duration. In response to the audio level falling below the threshold for the predefined duration, the signal processing circuitry can replace the at least one audio signal in the second plurality of signals with the audio component.

In another embodiment, a method or process for audio signal injection is described. The method can include receiving a first plurality of signals over a first HDMI port, where the first plurality of signals comprising a video component and an audio component. The method can also include receiving at least one audio signal over an audio source port, and transmitting a second plurality of signals over a second HDMI port, where the second plurality of signals based at least in part on the video component and the audio component from the first HDMI port. The method can also include determining that an audio level of the at least one audio signal exceeds a threshold. In response to the audio level exceeding the threshold, the method can also include transmitting the at least one audio signal in the second plurality of signals instead of the audio component.

In other aspects, the method can include determining that the audio level of the at least audio signal falls below the threshold for a predefined duration. In response to the audio level falling below the threshold for the predefined duration, the method can include replacing the at least one audio signal in the second plurality of signals with the audio component.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Figure 1:
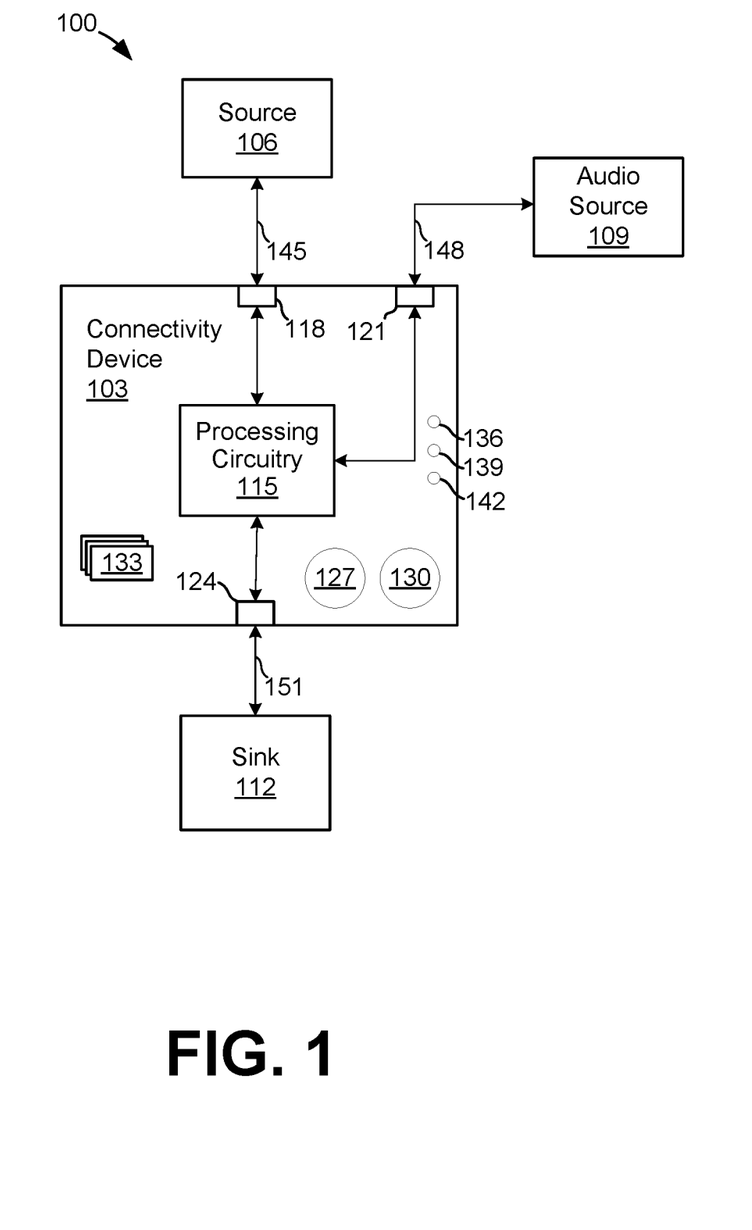
FIG. 1 is an illustration of a connectivity environment according to various example embodiments.

Turning now to the drawings, exemplary embodiments are described in detail. With reference to FIG. 1, shown is a block diagram of a connectivity device 103 in a connectivity environment 100 according to various embodiments of the present disclosure. The connectivity device 103 can be coupled to a source 106, an audio source 109, and a sink 112. The connectivity device 103 can include processing circuitry 115 coupled with a first input 118, a second input 121, and an output 124.

Although not shown, the connectivity device 103 can include additional inputs and outputs. Further, although the terms input and output are used, the first input 118, second input 121, and output 124 can correspond to any of a single outbound communication channel, a single inbound communication channel, or a bidirectional communication channel. In one example embodiment, the first input 118 and output 124 are high definition media interface (HDMI) ports and the second input 121 is a 3.5 mm audio jack. The inputs 118 and 121 and the output 124 can be a 3.5 mm audio port, an HDMI port, a Toshiba Link (TOSLINK) port, a Sony®/Philips® Digital Interface (S/PDIF) port, a lightning port, Musical Instrument Digital Interface (MIDI), or some other port. One or more of the inputs 118 and 121 and the output 124 can correspond to a wireless connection, such as Bluetooth, WIFI®, ZigBee®, ZWAVE®, Wireless 1080p, Wireless HDTV Link, Bravia® Wireless Link, Wireless Display Connectivity, AirPlay®, Chromecast®, Miracast®, or some other wireless channel.

The connectivity device 103 can also include a source sensitivity input 127 and an audio timeout input 130, one or more ports 133, a power indicator 136, a receive indicator 139, and a transmit indicator 142. The connectivity device 103 can be coupled to the source device 106 via a wired or wireless connection 145. Similarly, the connectivity device 103 can be coupled to the audio source 109 via a wired or wireless connection 148, and the connectivity device 103 can be coupled to the sink 112 via a wired or wireless connection 151. In one example embodiment, the connection 145 and the connection 151 are HDMI cables, while the connection 148 is a 3.5 mm audio cable. In another example, all three connections 145, 148, and 151 are HDMI cables, although other types of cables can be relied upon.

The processing circuitry 115 can be embodied as one or more processing circuits, processors, memory devices, and combinations thereof. The processing circuitry 115 can receive an audio video signal from the source 106 via connection 145 and input 118. The audio video signal can be a transition-minimized differential signaling (TMDS) signal. The audio video signal can be encrypted. As an example, the signal can correspond to a high-bandwidth digital content protection (HDCP) encrypted audio video signal. When encrypted, the processing circuitry 115 can decrypt the encrypted audio video signal to generate a decrypted audio video signal.

The processing circuitry 115 can generate an audio component and a video component from the audio video signal received from the source 106. As an example, the audio video signal can include a TDMS audio video signal, and the TMDS0, TMDS1, TMDS2, TMDS CLK signals of the TDMS audio video signal can include red, green, and blue video signals in addition to an audio signal and a clock signal. The audio signal can be separated from the video signal in the TDMS audio video signal.

The processing circuitry 115 can separately receive an audio signal from the audio source 109. The audio source 109 can be embodied as one or more devices capable of producing an audio signal, such as a portable music device, a home theater system, a smart speaker, a computer, or some other audio device(s). The audio signal may be floating if no audio source is coupled to the input 121. At some times, the audio source 109 may also be outputting no audio to the input 121. At other times, the audio source 109 may be streaming an audio signal. In some embodiments, the processing circuitry 115 can have no audio sources 109 connected wirelessly at a given time or can have multiple audio sources connected.

The processing circuitry 115 can be configured to sense which sources are outputting audio and intelligently switch to the appropriate audio signal. As an example, the processing circuitry 115 can determine an audio level of the audio signal from the audio source 109. When the audio level is below a threshold, the processing circuitry 115 can send the audio and video components from the source 106 to the sink 112. On the other hand, when the audio level of the audio signal from the audio source 109 exceeds the threshold, the processing circuitry 115 can output the video component from the source 106 along with the audio signal from the audio source 109.

If the audio level falls back below the threshold, the processing circuitry 115 can stop sending the audio from the audio source 109 to the sink 112 and instead send the audio and video components from the source 106 to the sink 112. In some embodiments, the audio must fall below the threshold for a predefined period of time before the processing circuitry 115 replaces the audio from the audio source 109 with the audio from the source 106. The predefined time can prevent the audio from switching during natural lows in audio, such as, for example, between tracks on a record or when transitioning to or from a commercial.

The threshold can be configurable or fixed. The threshold can be set via the source sensitivity input 127. In one embodiment, the source sensitivity input 127 is a variable input that can be set to a value corresponding to between zero and seven decibels or another suitable metric to measure the amplitude of the audio level of the of the audio signal from the audio source 109, although other input mechanisms and ranges can be used. Similarly, the predefined time can be configurable or fixed. The predefined time or duration can be set via the audio timeout input 130. In one embodiment, the audio timeout input 130 is a variable input that can be set to a value corresponding to between zero and seven seconds, although other input mechanisms and time ranges can be used. In other embodiments, the threshold and duration values are stored in a memory device of the processing circuitry 115. The threshold and duration values can be downloaded via a wired or wireless network or downloaded through a port, such as port 133, which can be a data port, such as a universal serial bus (USB) or similar data port.

The processing circuitry 115 can send the combined audio and video signal to the sink 112 in either encrypted or unencrypted forms. In some embodiments, the processing circuitry 115 re-encrypts the combined signal using HDCP, while in others the signal is sent unencrypted. Timing information corresponding to encryption can also be forwarded to enable decryption by the sink 112. If the processing circuitry 115 has power, the power indicator 136 can be illuminated or activated. When audio is received from the audio source, the processing circuitry 115 can illuminate or activate the receive indicator 139. Similarly, while transmitting a signal, the processing circuitry 115 can illuminate or activate the transmit indicator 142.

In some embodiments, the processing circuitry 115 includes a firmware input configured to enable firmware updates. While enabled, the firmware on the connectivity device 103 can be updated. As an example, a connection can be made via a port 133, such as a USB port, and firmware can be downloaded via the port 133. In some embodiments, the port 133 can also be used as a source of power. The firmware input can cause the USB port to refuse connections when in a disabled state, such that updates are only allowed when in an enabled state.

The connectivity device 103 can include an analog to digital converter (ADC). In some embodiments, the ADC can be coupled between the input 121 and the processing circuitry 115. The ADC can convert an analog audio signal from the audio source 109 into a digital audio signal for processing by the processing circuitry 115. The processing circuitry 115 can provide the converted digital audio signal to the sink 112 as described herein.

The processing circuitry 115 can also pass through or relay signals that are not audio or video between the source 106 to the sink 112. As an example, a CEC, SCL, SDA, DDC/CEC Ground, and Hot Plug Detect signals can all be received and relayed between the source 106 and the sink, among other signals.

Figure 2:
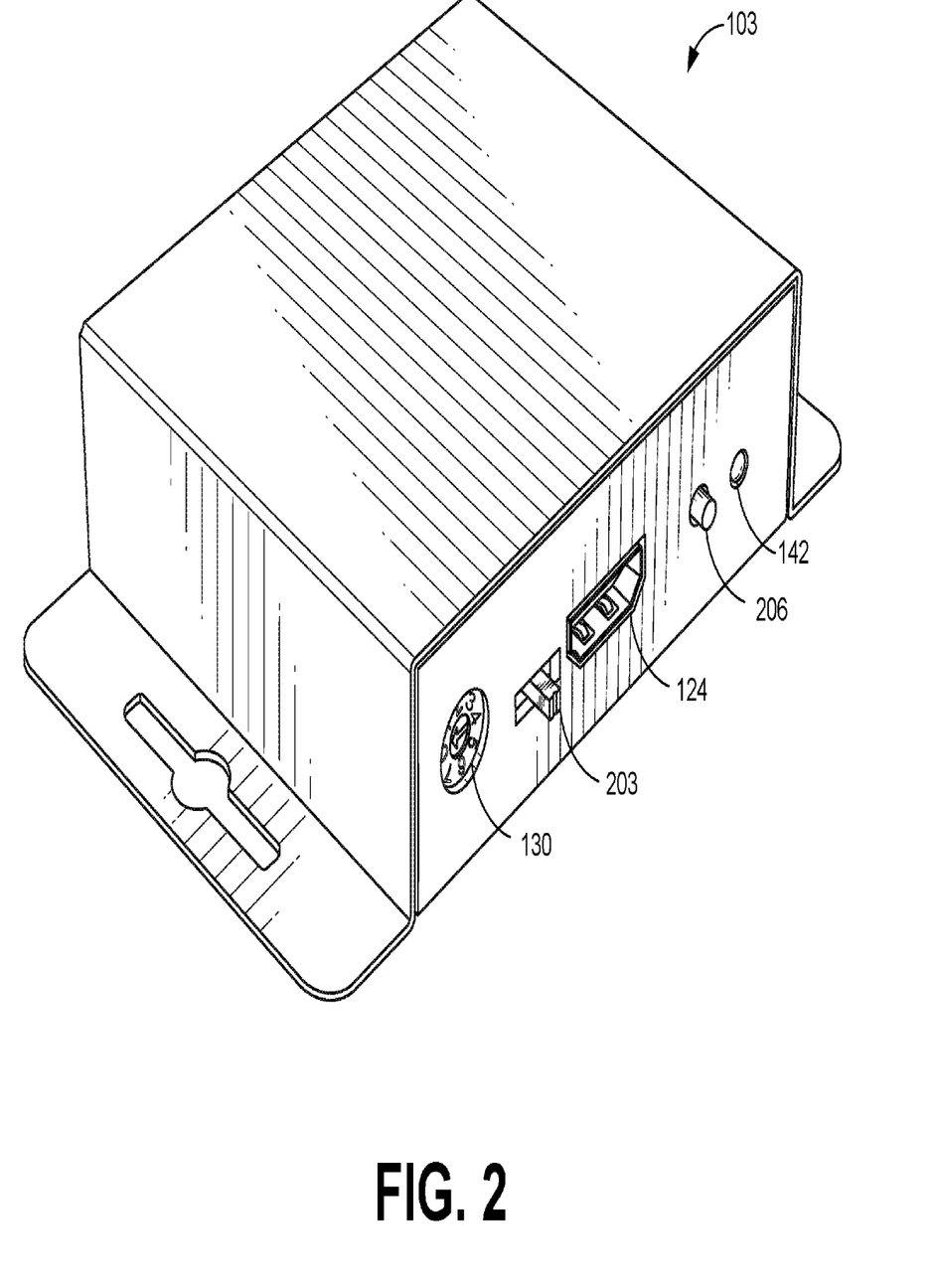
FIG. 2 is an illustration of a first side perspective view of an example connectivity device according to various example embodiments.
Figure 3:
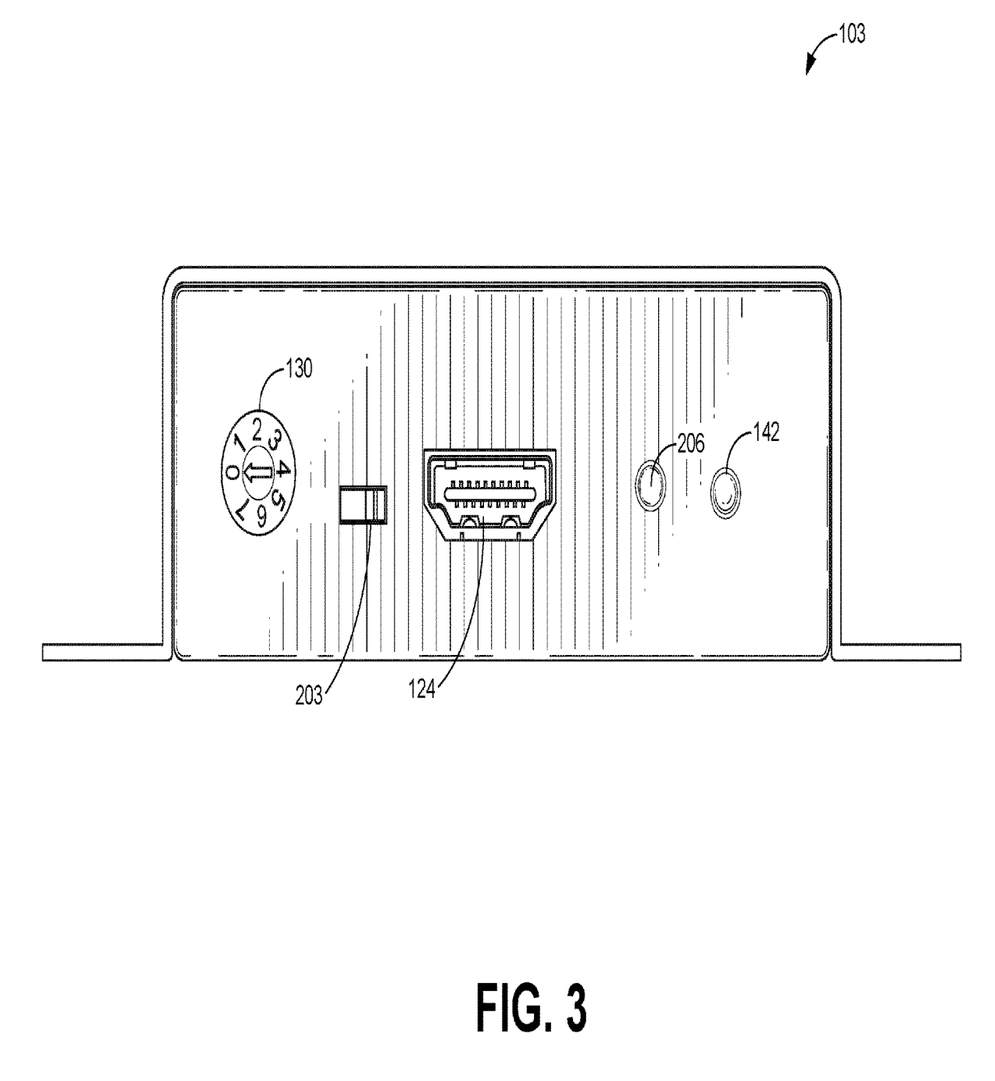
FIG. 3 is an illustration of a first side view of the example connectivity device shown in FIG. 2 according to various example embodiments.

With reference to FIG. 2, shown is a first side perspective view of an example connectivity device 103 according to various embodiments of the present disclosure. Shown in FIG. 3 is the connectivity device 103 of FIG. 2 from a side view. As shown in FIGS. 2 and 3, the example connectivity device 103 includes the audio timeout input 130, a firmware input 203, the output 124, a reset switch 206, and the transmit indicator 142. When a signal is being output from the output 124, the transmit indicator 142 can light up or indicate transmission. The transmit indicator 142 may flash repeatedly in sync with packets of data being transmitted over the output 124.

The processing circuitry 115 can reset when the reset switch 206 is toggled. As an example, if the reset switch 206 is toggled, a power signal to the connectivity device 130 can be toggled. The power signal can cause the processing circuitry 115 to reboot when removed and subsequently restored. The firmware input 203 can be embodied as a switch configured to enable firmware updates. While the firmware input 203 is enabled (e.g., toggled to one position), the firmware on the connectivity device 103 can be updated. As an example, a connection can be made via port 133 (FIG. 1), such as a USB port, and firmware can be downloaded to the connectivity device 130 via the port 133. The firmware input 203 can cause the USB port to refuse connections when in a disabled state, such that updates are only allowed when in an enabled state.

Figure 4:
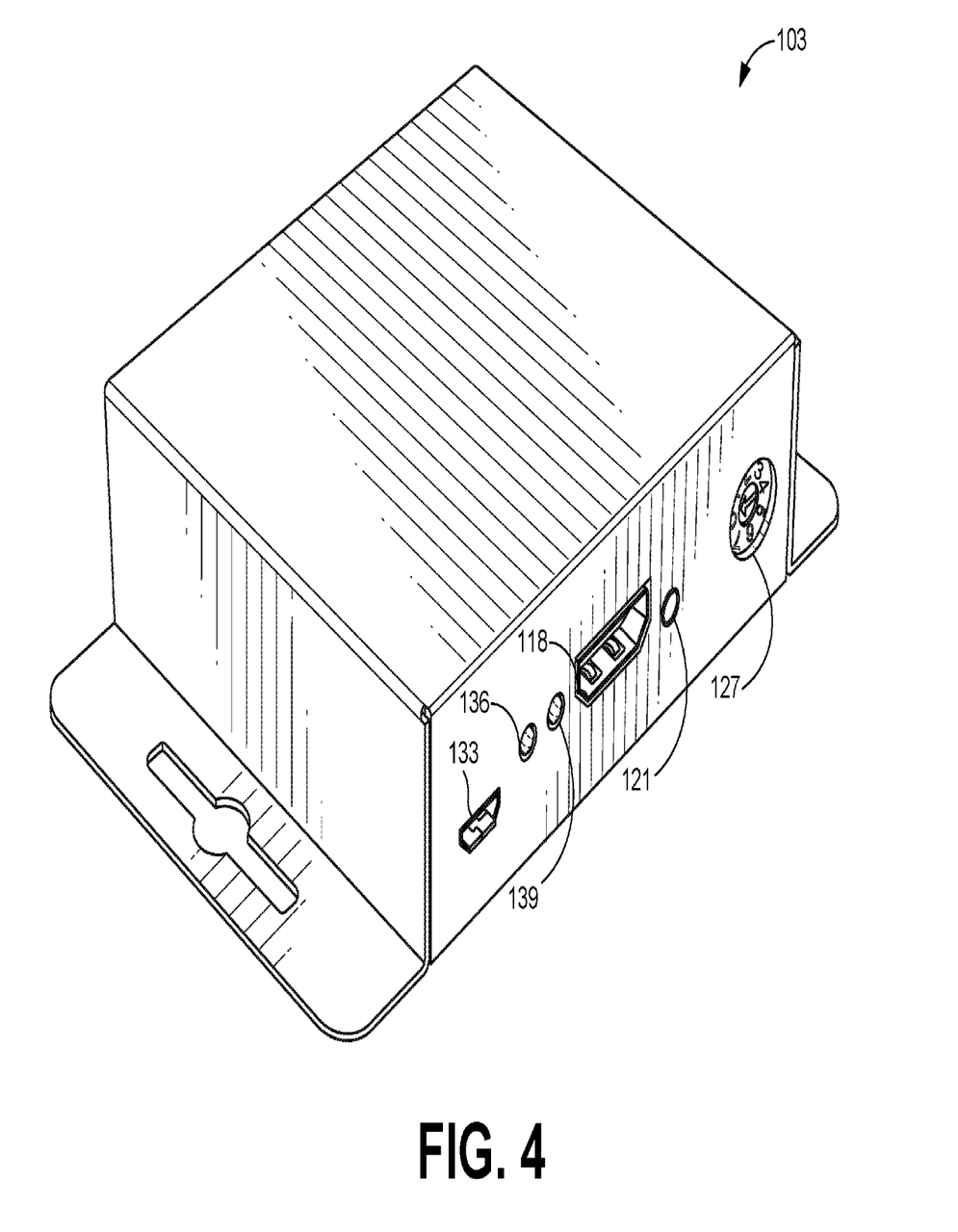
FIG. 4 is an illustration of a second side perspective view of the example connectivity device shown in FIG. 2 according to various example embodiments.
Figure 5:
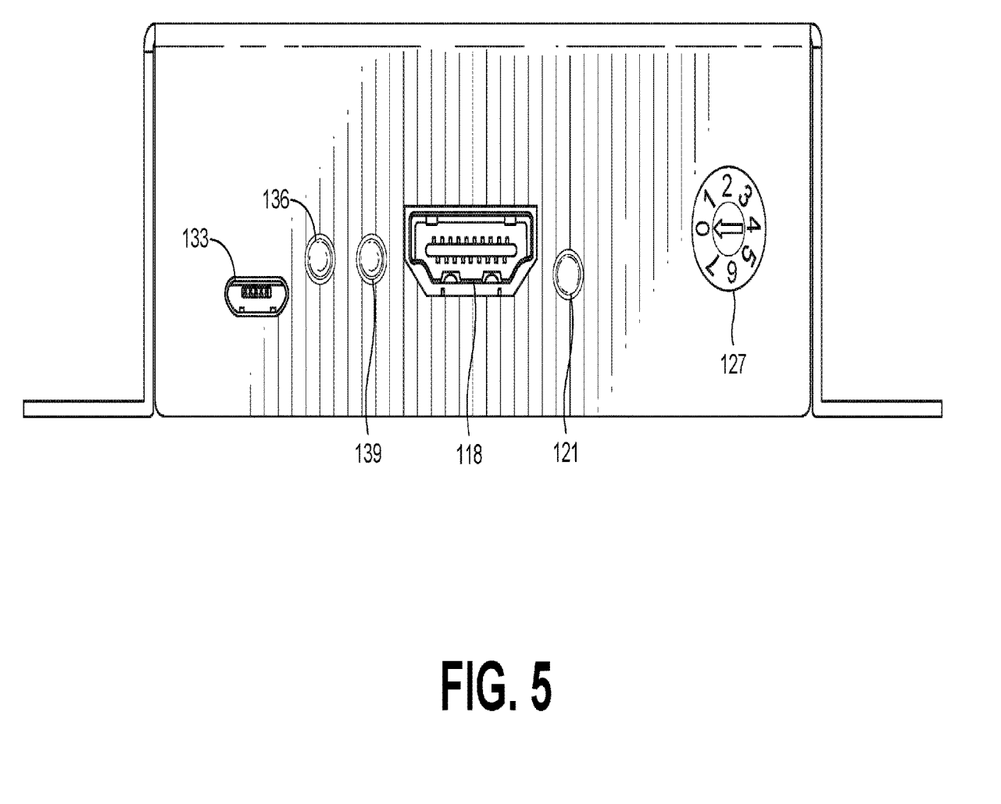
FIG. 5 is an illustration of a second side view of the example connectivity device shown in FIG. 2 according to various example embodiments.

With reference to FIG. 4, shown is a second side perspective view of the example connectivity device 103 according to various embodiments of the present disclosure. The other side of the example connectivity device 103 includes the port 133, the power indicator 136, the receive indicator 139, an input 118, and input 121, and a source sensitivity input 127. Shown in FIG. 5 is the connectivity device 103 of FIG. 4 from a second side view.

Figure 6:
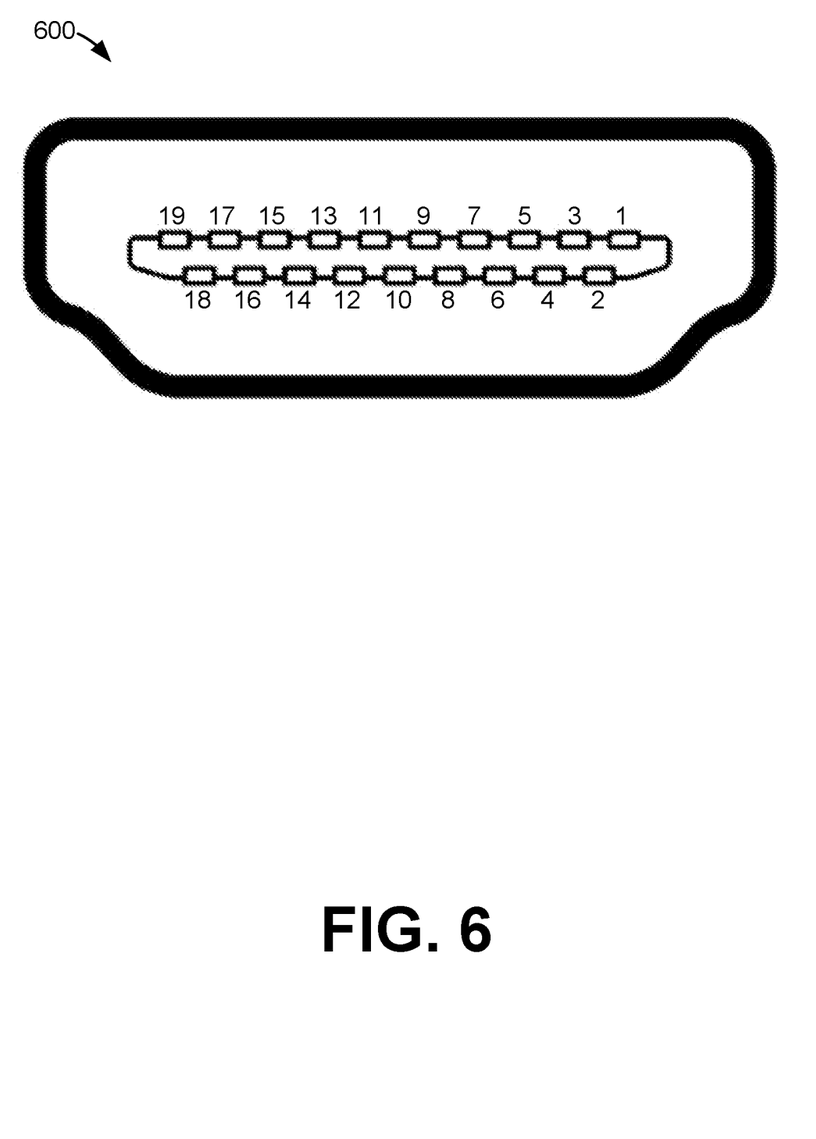
FIG. 6 illustrates a high definition media interface (HDMI) port according to various example embodiments.

Turning to FIG. 6, an example pinout of an HDMI port 600 is illustrated. In some embodiments, the HDMI port 600 can be relied upon in the connectivity device 103 (FIG. 1) as one or more of the first input 118, the second input 121, and the output 124. Generally, in the connectivity device 103, the HDMI port 600 can be relied upon for connections to HDMI cables such as the connections 145, 148, and 151. As illustrated in FIG. 6, the HDMI port 600 includes nineteen contacts or port pins. In other embodiments, the HDMI port 600 can include greater or fewer contacts. Table 1, below, provides a listing of the nineteen contacts or port pins in the HDMI port 600 and their corresponding HDMI signal names or pin identities. In Table 1, it can be appreciated that HDMI port 600 includes a plurality of contacts. A subset of the contacts including four pair of differential contacts, TMDS Data 0, 1, 2, and Clock.

TABLE 1

| HDMI Jack Pinout | |
|---|---|
| HDMI Port Pin | HDMI Signal Identity |
| 1 | TMDS Data 2+ |
| 2 | TMDS Data 2 Shield− |
| 3 | TMDS Data 2− |
| 4 | TMDS Data 1+ |
| 5 | TMDS Data 1 Shield |
| 6 | TMDS Data 1− |
| 7 | TMDS Data 0+ |
| 8 | TMDS Data 0 Shield |
| 9 | TMDS Data 0− |
| 10 | TMDS Clock+ |
| 11 | TMDS Clock Shield |
| 12 | TMDS Clock− |
| 13 | CEC |
| 14 | Reserved |
| 15 | SCL |
| 16 | SDA |
| 17 | DDC/CEC Ground |
| 18 | +5 V Power |
| 19 | Hot Plug Detect |

Figure 7:
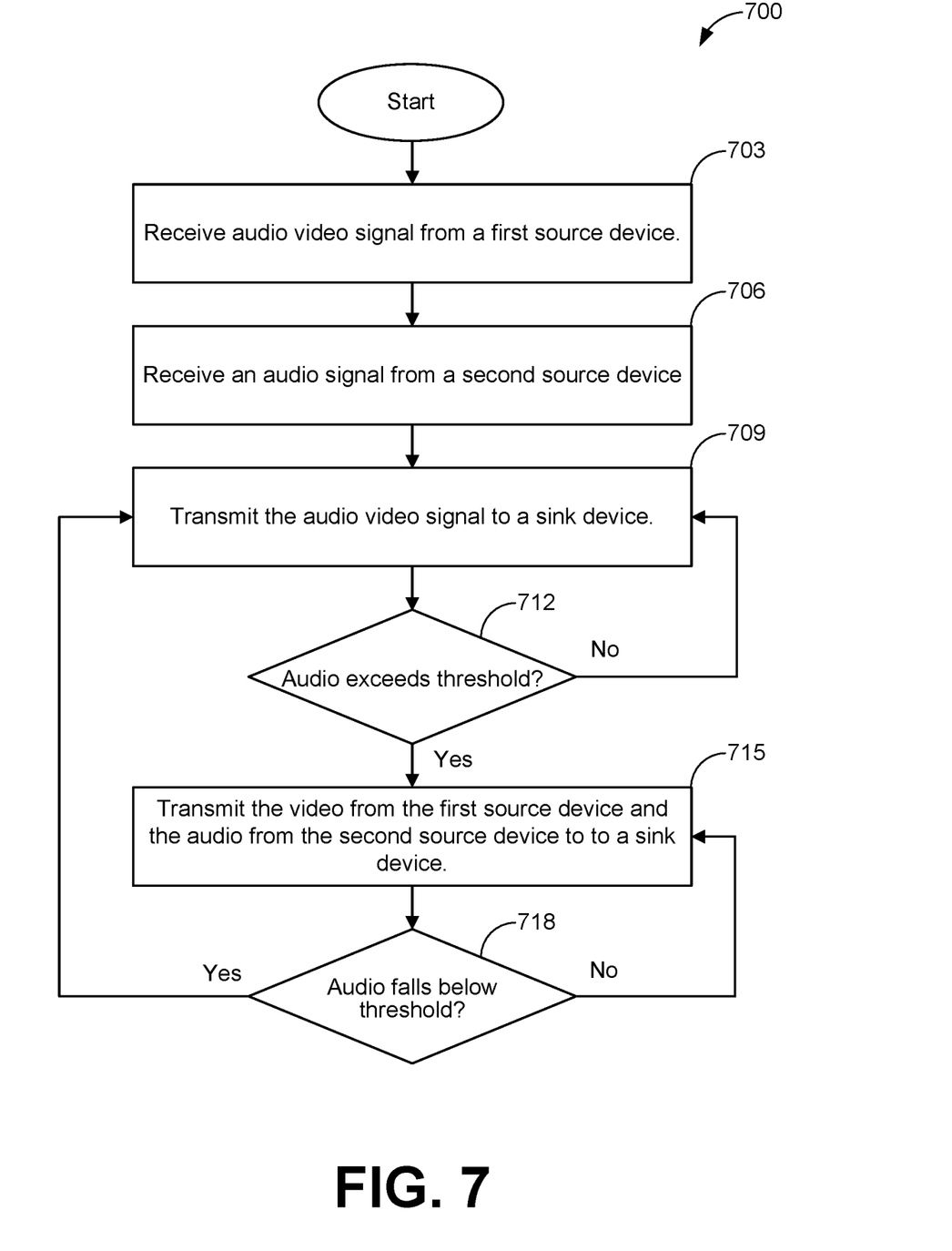
FIG. 7 illustrates an example flowchart of certain functionality implemented by portions of processing circuitry of the connectivity device in the connectivity environment of FIG. 1 according to various example embodiments.

FIG. 7 illustrates an example flowchart of certain functionality implemented by the connectivity device 103 of FIG. 1. Before turning to the process 700 of FIG. 7, it is noted that embodiments described herein may be practiced using an alternative order of the steps illustrated in FIG. 7.

That is, the process 700 illustrated in FIG. 7 is provided as an example only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments. Moreover, while the process shown in FIG. 7 is described as being performed by the connectivity device 103, other connectivity devices can be relied upon to perform the process.

At box 703, the process 700 can include receiving an audio video signal from a source device. As an example, the processing circuitry 115 (FIG. 1) can receive an audio video signal from a source 106 (FIG. 1).

At box 706, the process 700 can include receiving an audio signal from a second source device. For example, the processing circuitry 115 can receive an audio signal from the audio source 109 (FIG. 1).

At box 709, the process 700 can include transmitting the audio video signal to a sink device. For example, the processing circuitry 115 can transmit the audio video signal from the source 106 to the sink 112 (FIG. 1). The processing circuitry 115 can pass through the audio video signal received from the source 106 to the sink 112. The audio signal can be of LPCM 2/5.1/7.1CH, Dolby Digital®, DTS® 5.1, Dolby Digital+®, Dolby TrueHD®, DTS-HD Master Audio®, Dolby Atmos®, DTS:X®, or another audio format. The audio video signal can correspond to a resolution of video, such as 4k, 1080p, 1080i, 720p, or some other resolution. In some embodiments, the audio video signal can include HDR10 and Dolby Vision® support. The processing circuitry 115 can pass through any PCM, Dolby®, and DTS® audio signals between the source device 106, the audio source 109, and the sink device 112.

At box 712, the process 700 can include determining whether an audio level of the audio signal received in box 706 exceeds a threshold. As an example, the processing circuitry 115 can monitor an audio level of the audio signal being received from the audio source 109. When the audio level exceeds a threshold, the process 700 proceeds to box 715. Otherwise, the process proceeds to box 709.

At box 715, the process 700 can include transmitting the video from the audio video source along with the audio from the audio source to a sink device. For example, the processing circuitry 115 can extract a video component from the source 106. The processing circuitry 115 can merge the video component from the source 106 with the audio signal from the audio source 109. The processing circuitry 115 can send the merged signal to the sink 112.

At box 718, the process 700 can include determining whether the audio level falls below a threshold. For example, the processing circuitry 115 can determine whether the audio level corresponding to the audio signal from the audio source 109 falls below the threshold. If the audio signal falls below the threshold, the process 700 proceeds to box 709. Otherwise, the process 700 proceeds to box 715. In some embodiments, the processing circuitry 115 may wait to see if the audio signal falls below the threshold for a predetermined duration of time. In these embodiments, until the duration of sub-threshold audio levels exceeds the duration threshold, the process 700 will not proceed to box 709. If the audio level exceeds the threshold before the duration being exceeded, the duration timer will be cleared.

Figure 8:
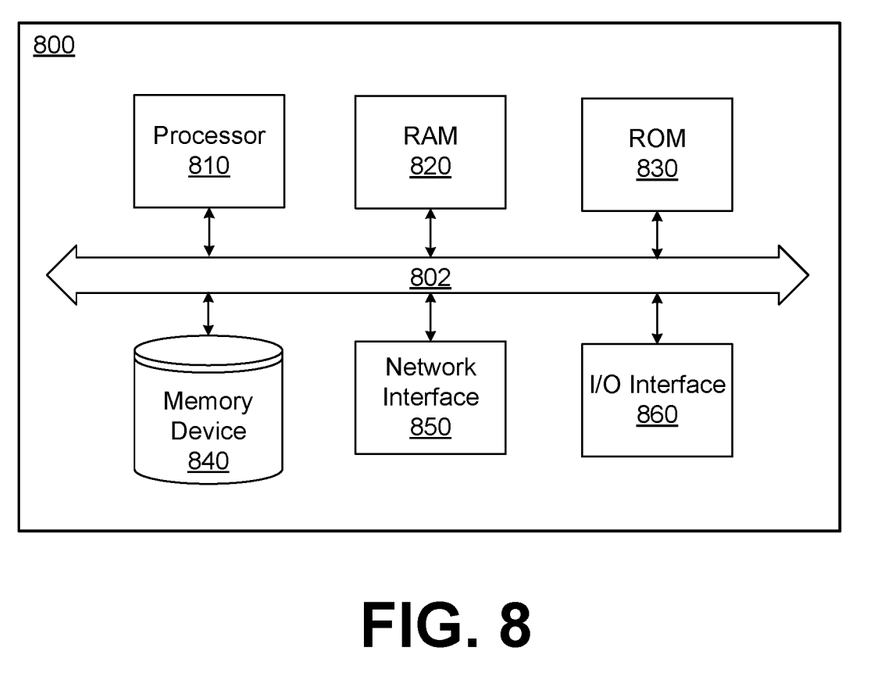
FIG. 8 is a schematic block diagram that illustrates an example computing device according to various example embodiments.

Turning to FIG. 8, an example hardware diagram of a computing device 800 is illustrated. The processing circuitry 115 and, in some cases, other components of the Any of the functionality described in the processing circuitry 115 may be implemented, in part, using one or more elements of the computing device 800. The functionality described in the processing circuitry 115 can also be performed in part or in whole using hardware circuitry. The computing device 800 can include one or more of a processor 810, a Random Access Memory (RAM) 820, a Read Only Memory (ROM) 830, a memory device 840, a network interface 850, and an Input Output (I/O) interface 860. The elements of the computing device 800 are communicatively coupled via a bus 802.

The processor 810 can include an arithmetic processor, Application Specific Integrated Circuit (ASIC), or other types of hardware or software processors. The RAM and ROM 820 and 830 can include a memory that stores computer-readable instructions to be executed by the processor 810. The memory device 830 stores computer-readable instructions thereon that, when executed by the processor 810, direct the processor 810 to execute various aspects of the present disclosure described herein. When the processor 810 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 830 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 850 can include hardware interfaces to communicate over data networks. The I/O interface 860 can include device input and output interfaces such as keyboard, pointing device, display, communication, and other interfaces. The bus 802 can electrically and communicatively couple the processor 810, the RAM 820, the ROM 830, the memory device 840, the network interface 850, and the I/O interface 860, so that data and instructions may be communicated among them.

In operation, the processor 810 is configured to retrieve computer-readable instructions stored on the memory device 840, the RAM 820, the ROM 830, or another storage means, and copy the computer-readable instructions to the RAM 820 or the ROM 830 for execution, for example. The processor 810 is further configured to execute the computer-readable instructions to implement various aspects and features of the present disclosure. For example, the processor 810 may be adapted and configured to execute the processes described above with reference to FIG. 7, including the processes described as being performed by the processing circuitry 115.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

The invention claimed is:

1. Signal processing circuitry comprising:
   circuitry for receiving a first signal from a first source and a second signal from a second source, wherein the first signal includes an audio signal from the first source, and wherein the second signal includes an audio signal from the second source;
   circuitry for determining a threshold of at least one of the audio signal from the first source and the audio signal from the second source; and
   circuitry for transmitting one of the audio signal from the first source and the audio signal from the second source according to the threshold determined by the circuitry for determining;
   wherein the threshold is an audio level of at least one of the audio signal from the first source and the audio signal from the second source;
   wherein the circuitry for transmitting is configured to transmit the audio signal from the first source when the audio level of the audio signal of the second source is below the threshold, and wherein the circuitry for transmitting is configured to transmit the audio signal from the second source when the audio level of the audio signal from the second source is above the threshold.

2. The signal processing circuitry of claim 1, wherein the first signal from the first source includes a video signal from the first source.

3. The signal processing circuitry of claim 2, wherein the circuitry for transmitting is configured to transmit the audio signal from the first source and the video signal from the first source when the audio level of the audio signal of the second source is below the threshold, and wherein the circuitry for transmitting is configured to transmit the audio signal from the second source and the video signal from the first source when the audio level of the audio signal from the second source is above the threshold.

4. The signal processing circuitry of claim 3, wherein the circuitry for transmitting is configured to transmit the audio signal from the first source instead of the audio signal from the second source after the audio level of the audio signal from the second source falls below the threshold.

5. A system for signal processing, comprising:
   a first source for outputting a first signal including a first source audio signal;
   a second source for outputting a second signal including a second source audio signal;
   processing circuitry for processing at least one of the first signal and the second signal; and
   a sink source for receiving at least one of the first source audio signal and the second source audio signal from the processing, circuitry;
   wherein the processing circuitry is configured to determine an audio level of at least one of the first source audio signal and the second source audio signal;
   wherein the processing circuity is configured to transmit the first source audio signal to the sink source when the audio level of the second source audio signal is below a threshold, and wherein the processing circuitry is configured to transmit the second source audio signal to the sink source when the audio level of the second source audio signal is above the threshold.

6. The system of claim 5, wherein the first signal further includes a video signal.

7. The system of claim 6, wherein the processing circuitry is configured to transmit the first source audio signal and the video signal to the sink source when the audio level of the second source audio signal is below the threshold, and wherein the processing circuitry is configured to transmit the second source audio signal and the video signal to the sink source when the audio level of the second source audio signal is above the threshold.

8. The system of claim 7, wherein the processing circuitry is configured to transmit the first source audio signal instead of the second source audio signal after the audio level of the second source audio signal falls below the threshold.

9. A method of signal processing, comprising the steps of:
   receiving a first signal from a first source and a second signal from a second source, wherein the first signal includes an audio signal from the first source, and wherein the second signal includes an audio signal from the second source;
   determining a threshold of at least one of the audio signal from the first source and the audio signal from the second source; and
   transmitting one of the audio signal from the first source and the audio signal from the second source according to the determined threshold;
   wherein the threshold is an audio level of at least one of the audio signal from the first source and the audio signal from the second source;
   wherein the step of transmitting comprises transmitting the audio signal from the first source when the audio level of the audio signal of the second source is below the threshold, and transmitting the audio signal from the second source when the audio level of the audio signal from the second source is above the threshold.

10. The method of claim 9, wherein the first signal from the first source includes a video signal from the first source.

11. The method of claim 10, wherein the step of transmitting comprises transmitting the audio signal from the first source and the video signal from the first source when the audio level of the audio signal of the second source is below the threshold, and transmitting the audio signal from the second source and the video signal from the first source when the audio level of the audio signal from the second source is above the threshold.

12. The method of claim 11, further comprising the step of transmitting the audio signal from the first source instead of the audio signal from the second source after the audio level of the audio signal from the second source falls below the threshold.

* * * * *